(12) United States Patent
McQueen

(10) Patent No.: US 6,809,847 B2
(45) Date of Patent: Oct. 26, 2004

(54) SCANNER WITH SYNCHRONOUSLY SWITCHED OPTICS

(75) Inventor: Alexander M. McQueen, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 81 days.

(21) Appl. No.: 09/912,605

(22) Filed: Jul. 24, 2001

(65) Prior Publication Data

US 2001/0053013 A1 Dec. 20, 2001

Related U.S. Application Data

(62) Division of application No. 09/300,629, filed on Apr. 27, 1999, now Pat. No. 6,266,175.

(51) Int. Cl.[7] .............................................. G02B 26/08
(52) U.S. Cl. ...................... 359/212; 359/216; 359/900; 235/462.36; 235/462.39
(58) Field of Search ................................. 359/196–226; 235/462.01, 462.4, 470, 472.01, 462.32, 462.36, 462.38, 462.39

(56) References Cited

U.S. PATENT DOCUMENTS

| 4,560,862 A | 12/1985 | Eastman et al. |
| 4,808,804 A | 2/1989 | Krichever et al. |
| 5,386,107 A | 1/1995 | Dvorkis et al. |
| 5,475,206 A | 12/1995 | Redderson et al. |
| 5,641,958 A | 6/1997 | Rudeen |
| 5,693,930 A | 12/1997 | Katoh et al. |
| 5,768,001 A | 6/1998 | Kelley et al. |
| 5,837,988 A | 11/1998 | Bobba et al. |
| 5,869,827 A | 2/1999 | Rando |

Primary Examiner—James Phan
(74) Attorney, Agent, or Firm—Stoel Rives LLP

(57) ABSTRACT

A method of and system a system for generating scan lines having different beam characteristics. In one embodiment, the beam is focused at different distances depending upon the scan line. A system may comprise a light source generating a reading beam, a suitable scanning mechanism such as a polygon mirror having a plurality of mirror facets, a beam correction plate in the beam path mounted to the facet wheel and rotating therewith. The reading beam passes through the correction plate and is then reflected off the mirror facet, the correction plate adjusting a beam characteristic, such as beam focus, scan angle, or beam power, for each mirror facet or portion of a mirror facet.

24 Claims, 11 Drawing Sheets

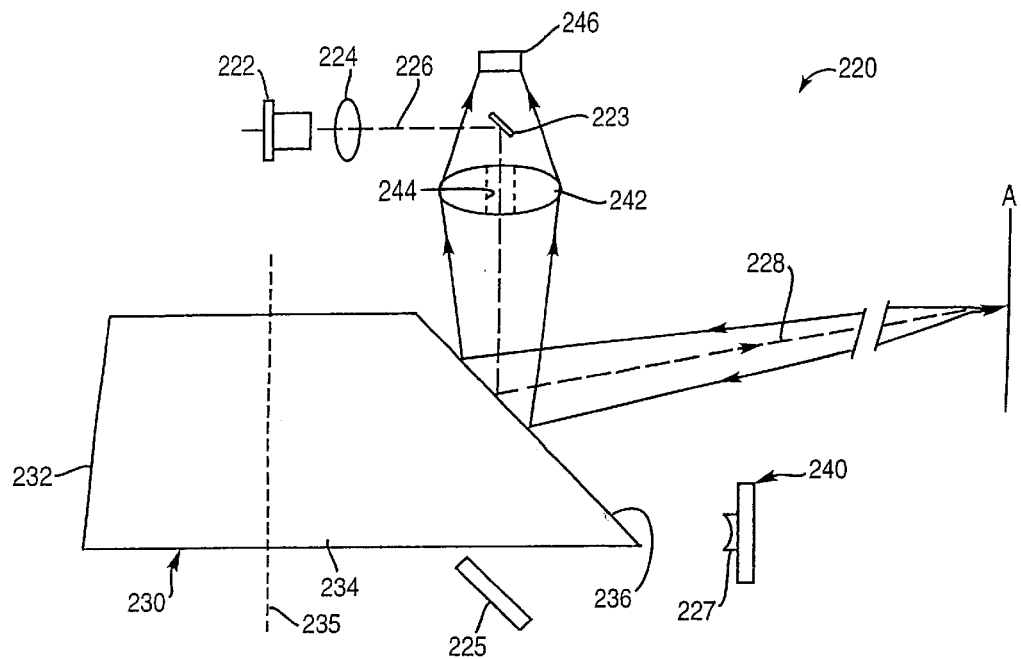
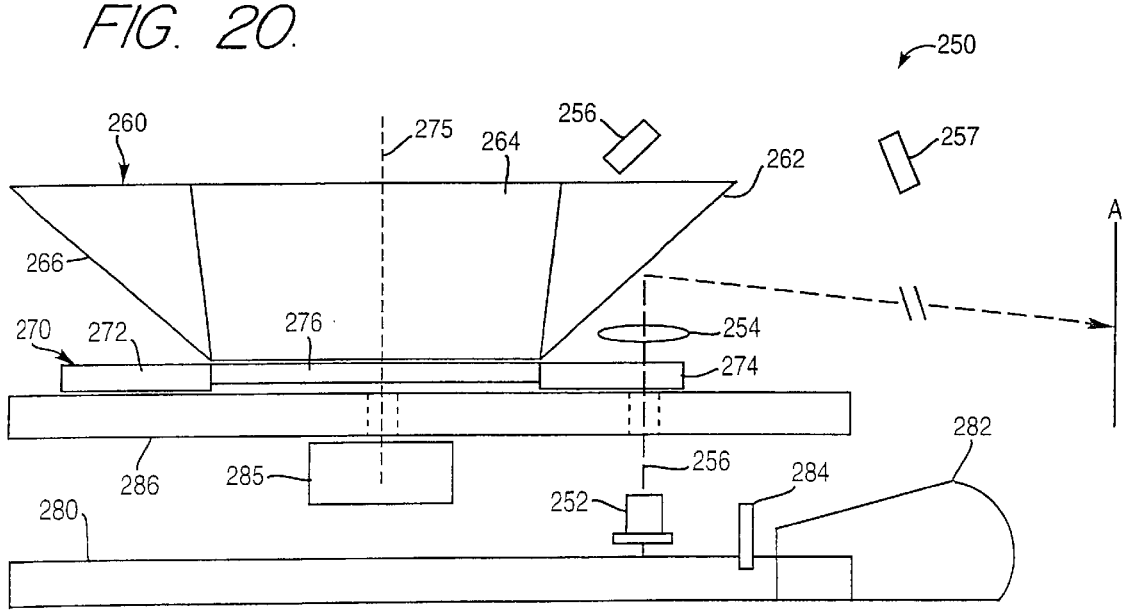

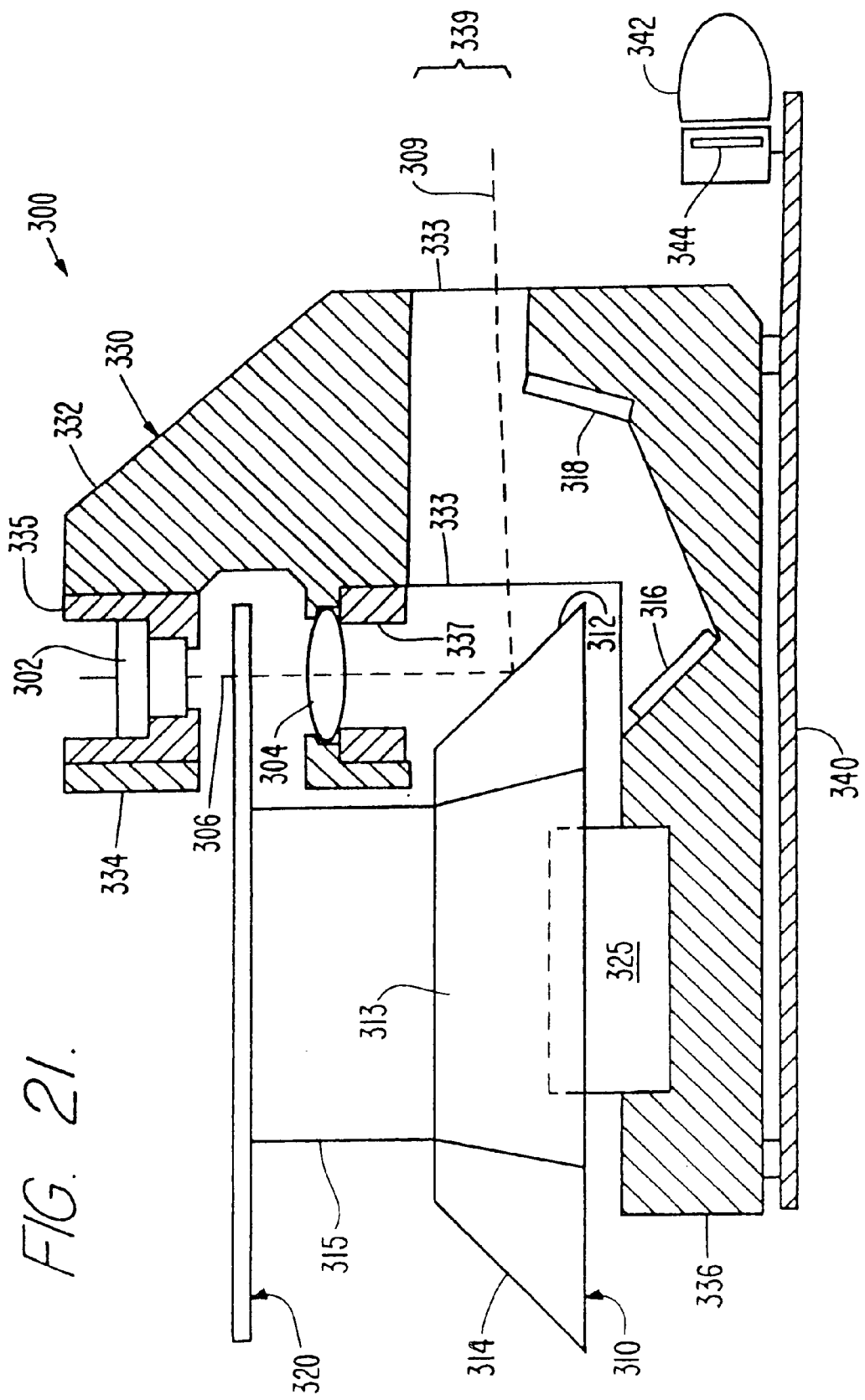

SCANNER WITH SYNCHRONOUSLY SWITCHED OPTICS

This application is a divisional of application Ser. No. 09/300,629 filed Apr. 27, 1999, U.S. Pat. No. 6,266,175.

BACKGROUND OF THE INVENTION

The field of the present invention relates to data reading systems. In particular, a method and apparatus are described herein for creating an optical code scanner with a wide range of reading distances.

Longer range scanners have been proposed of a variety configurations. In U.S. Pat. No. 5,869,827 multiple beam sources and distance sensing mechanisms are employed to provide an extended focus range. In U.S. Pat. No. 5,641,958 as employed in the PSC SP400LR scanner, an LCD diffractive control module changes the waist location of the scanning beam. In U.S. Pat. No. 4,560,862 the facets of a polygon mirror are provided with different curvatures such that the scan lines produced by the different facets are focused at varying distances.

SUMMARY OF THE INVENTION

The present invention is directed to a system for and a method of generating scan lines having different beam characteristics. In a preferred system, one or more beam characteristics, such as focal distance, scan angle, beam power, or polarization of the scan beam are automatically adjusted as between consecutive scans of the scanning mechanism. For example, the beam may be focused at different distances depending upon the scan line. In a preferred embodiment, the system comprises a light source generating a reading beam, a suitable scanning mechanism such as a polygon mirror having a plurality of mirror facets, and a beam correction plate in the beam path mounted to the facet wheel and rotating therewith. The reading beam passes through the correction plate and is then reflected off the mirror facet, the correction plate adjusting a beam characteristic for each mirror facet or portion of a mirror facet. In another embodiment, alone or combined with the previous system, the light beam is routed along different paths to the mirror facets, for example (1) along a path parallel to the rotational axis of the facet wheel when directed onto a first mirror facet and (2) along a path perpendicular to the rotational axis when being directed onto a second mirror facet thereby adjusting scan angle while maximizing beam power.

BRIEF DESCRIPTION OF THE DRAWINGS

FIGS. 18–19 are schematic diagrams illustrating a retro-directive scanning system.

FIG. 20 is a schematic diagram illustrating a non-retrodirective scanning system.

FIG. 21 is a side view in partial cross section of a scanning system illustrating an example component mounting system.

DETAILED DESCRIPTION OF THE PREFERRED EMBODIMENTS

Figure 1:
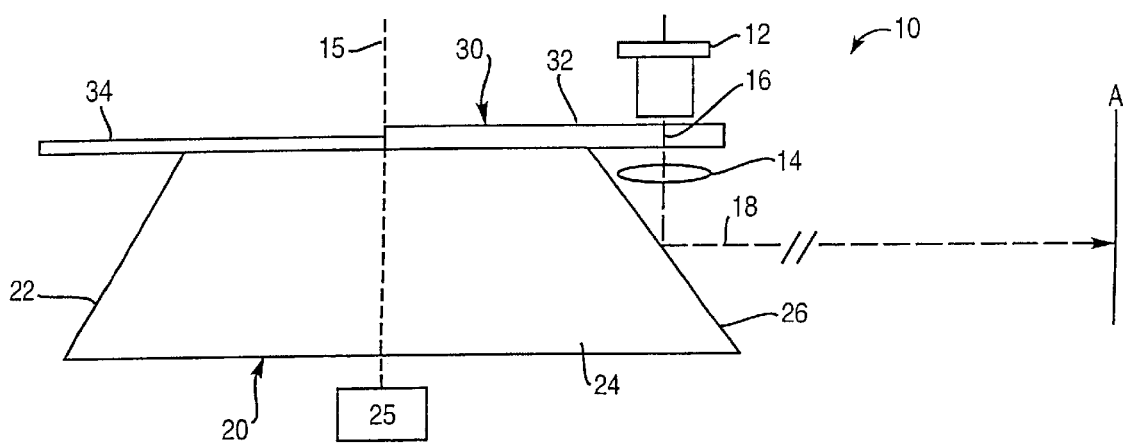
FIGS. 1–2 are schematic diagrams illustrating a scanning system according to a first embodiment of the present invention.

Preferred embodiments of the present invention will now be described with reference to the drawings. To facilitate description, any reference numeral representing an element in one figure will represent the same element in any other figure.

Figure 2:
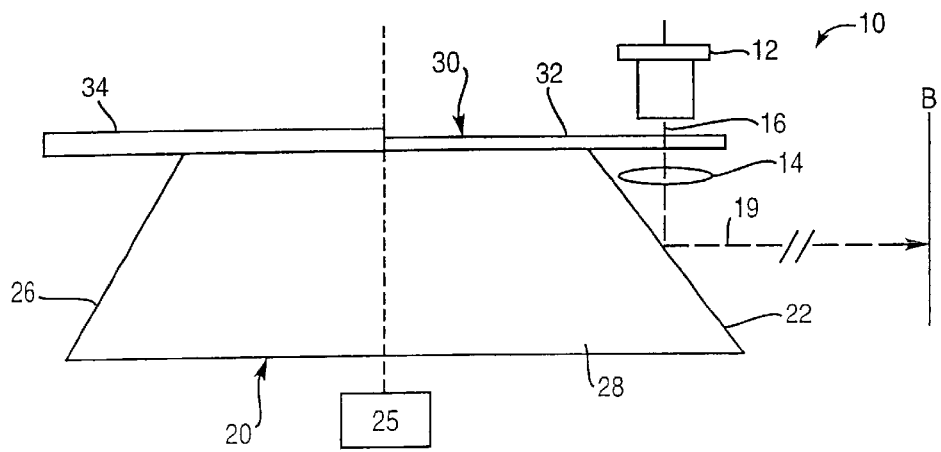

FIGS. 1–2 illustrate a first embodiment in which a scanning system 10 provides a wider reading range by producing scan beams with multiple focal regions. In system 10, a light source 12, such as a visible laser diode (VLD) produces a light beam 16 which is directed onto a rotating facet wheel 20 which scans the beam 16 over a given scan angle to create scan lines into a scan volume. The system 10 creates multiple focal regions by interposing a stepped-thickness, transparent, plane-parallel plate 30 between the light source 12 and the source beam forming lens 14. By introducing the plate 30 between the light source 12 and lens 14, the apparent optical path length between these elements shifts by an amount given by:

$$\frac{N-1}{N} \times t$$

where N is the refractive index of the transparent plate material and t is the physical thickness of the plate 30. The plate 30 has two or more regions 32, 34 of different thickness N corresponding to different facets 22, 24, 26, 28 of the facet wheel 20 or different portions of the facets. By interposing different thickness sections 32, 34 of the plate in the path of the reading beam 16, the apparent distance between the source 12 and lens 14 is shifted, re-imaging the "waist" or beam focus on the other side of the lens 14. Thus the waist or beam focus of the scanned beam is typically shifted by a much greater amount. The amount the waist of the scanned beam 18 is moved depends upon the longitudinal magnification of the system, which is one of the design parameters which may be selected for optimum desired performance.

In a preferred configuration, the plate 30 is comprised of sectors 32, 34 of different thickness and is connected to the rotating polygon assembly 30 such that successive sectors in turn are introduced between the VLD 12 and lens 14 as the polygon 30 rotates. Each sector 32, 34 will create a specific focal distance and reading range for the scanner 10. The focal distances may change in any sequence as defined by the order of the thickness of the various plate sectors and the rotation of the polygon. The plate 30 has two semicircular sectors, a thick sector 32 and a thin sector 34. As shown in FIG. 1, when the beam 16 passes through the thick sector 32, and scanned by the facet 26, the waist of the scan beam 18 is focused to long range A. As shown in FIG. 2 when the beam 16 passes through the thin sector 34, and scanned by facet 22, the waist of the scan beam 18 is focused to short range B.

The optical plate 30 may be integrally molded of optical plastic material as a single element and then mounted to the facet wheel 20 by connectors, two-sided tape, glue or other suitable attachment means. Alternately the plate 30 may be co-molded with the facet wheel 20 forming a single integrally formed unit. The sectors 32, 34 may comprise the same material providing the change in optical property by the thickness thereof, or the sectors could be of any thickness and of different optical material, for example optical plastics having different index of refraction. One or more sectors may even be omitted (the sector material thus being air) and achieve the different optical characteristics.

The plate 30 is mounted either directly onto the facet wheel 20 or otherwise mounted to rotate therewith such as by mounting on a common drive shaft (shown diagrammatically as rotational axis 15). A drive motor 25, preferably a brushless electromagnetic motor such as described in U.S. Pat. No. 5,475,206 hereby incorporated by reference, drives the rotating assembly (comprised of the plate 30 and the facet wheel 20).

The plate 30 may comprise provide various optical and physical properties. When comprising a stepped-thickness, transparent, plane-parallel plate, the mere thickness of the optical glass or plastic (particularly when positioned upstream of the focusing lens 14) adjusts the position of the focal plane (plane A or B) for the beam. The plate sectors may comprise other material and optical properties. For example the plate sectors may comprise a holographic element, filter (e.g. band pass or polarity), or the like to adjust beam power, wavelength, scan angle, or scan line selection (particularly for multi-scan line fixed scanner applications).

The plate 30 may provide various physical properties. Positioned on the top of the facet wheel 20, the plate may also comprise (a) windage elements to provide air flow control which may be required due to the high velocity (e.g. 3000 rpm) of the rotating assembly 20/30; (b) assembly elements assisting in the attachment of the mirror facets; or (c) reflective element for reflecting a portion of the beam for motor control timing.

Figure 3:
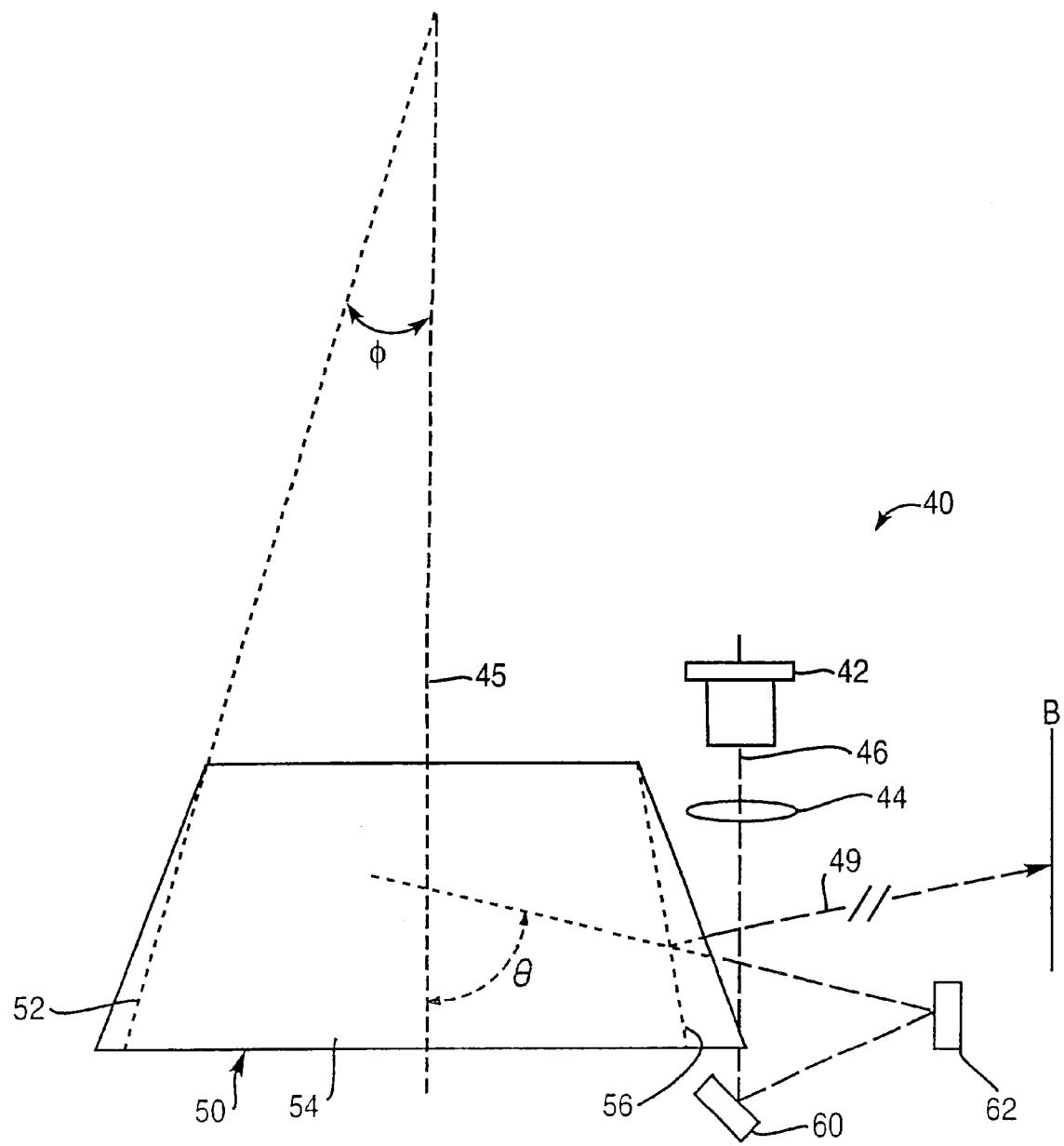
FIGS. 3–4 are schematic diagrams illustrating a scanning system accordin to a second embodiment.
Figure 4:
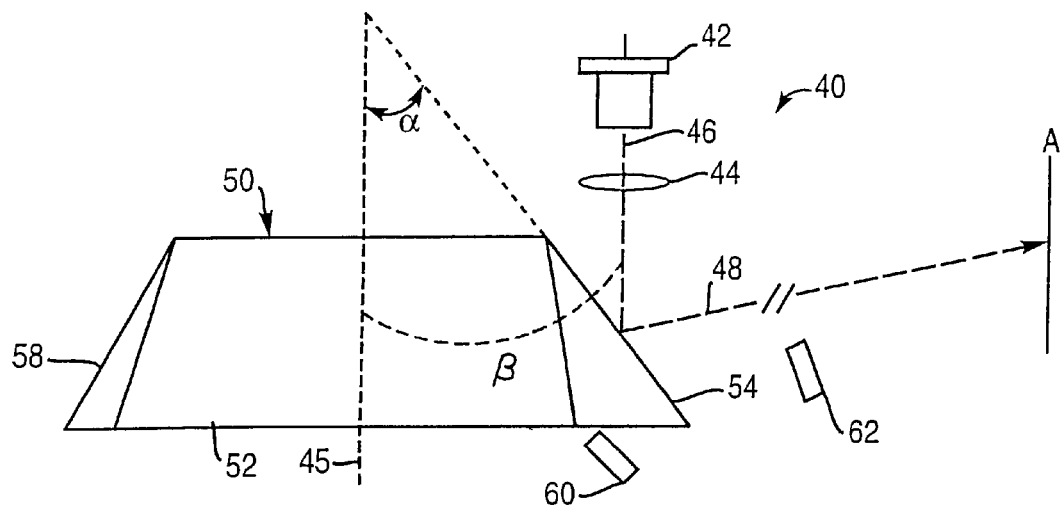

FIGS. 3–4 illustrate a scan system 40 comprising a facet wheel 50 having facets 52, 54, 56, 58 arranged at different angles. The light source such as a laser diode 42 generates a reading beam 46 which is focused by focusing lens element(s) 44. The focusing lens 44 may be integrally assembled with the laser diode 42. The reading beam 46 is directed along a path parallel to the rotational axis 45 of the facet wheel 50. The structure of the facet wheel 50 is symmetrical with the facets 52, 56 disposed on opposite sides of the wheel 30 arranged at a first (smaller) angle φ to the axis 45 and the facets 54, 58 disposed on opposite sides at a second (larger) angle α to the axis 45. As shown in FIG. 3, the facet 56 is arranged such that the beam 46 passes the facet 56 and is reflected first off fold mirror 60 and then fold mirror 62 and then directed onto the facet 56 which produces a scan beam 49 into the scan volume. The width of the scan line at focal distance plane B will be wide angle due to the incoming angle θ being approximately perpendicular to the axis of rotation 45. As shown in FIG. 4, the facet 54 is arranged at an angle α extending radially outward by a sufficient amount to intersect beam 46 and produce scan beam 48 into the scan volume. The reading beam 46 is directed along an incoming path to the mirror facet 54 at an incoming or incident angle β generally parallel to the rotation axis 45. The incident angle β of the reading beam 46 being generally parallel to the rotational axis 45 creates a narrower scan angle at the focal plane A. Thus the system 40 creates two different width scan lines at approximately the same focal planes A, B.

Figure 5:
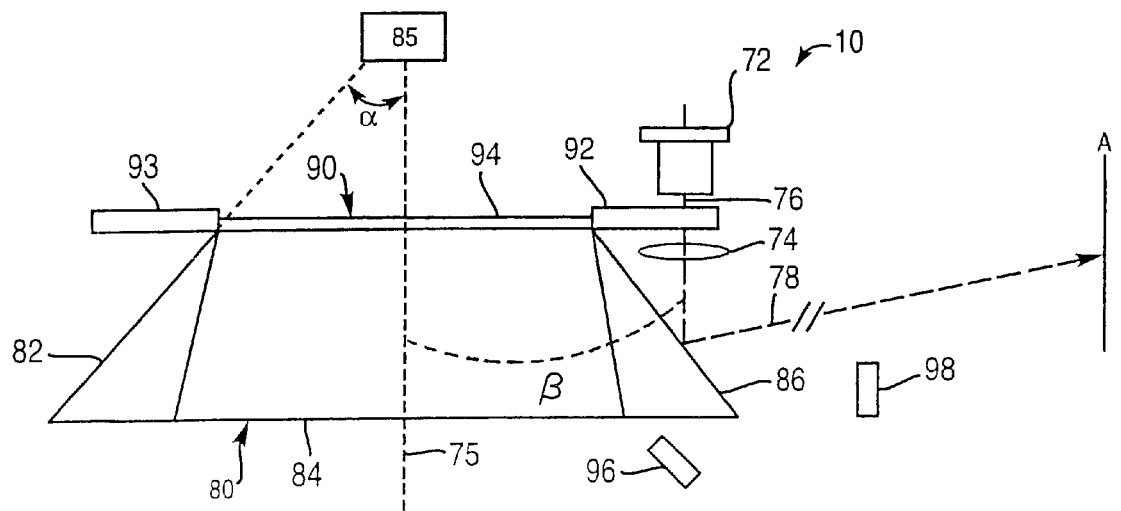
FIGS. 5–6 are schematic diagrams illustrating a scanning system accordin to a third embodiment.
Figure 6:
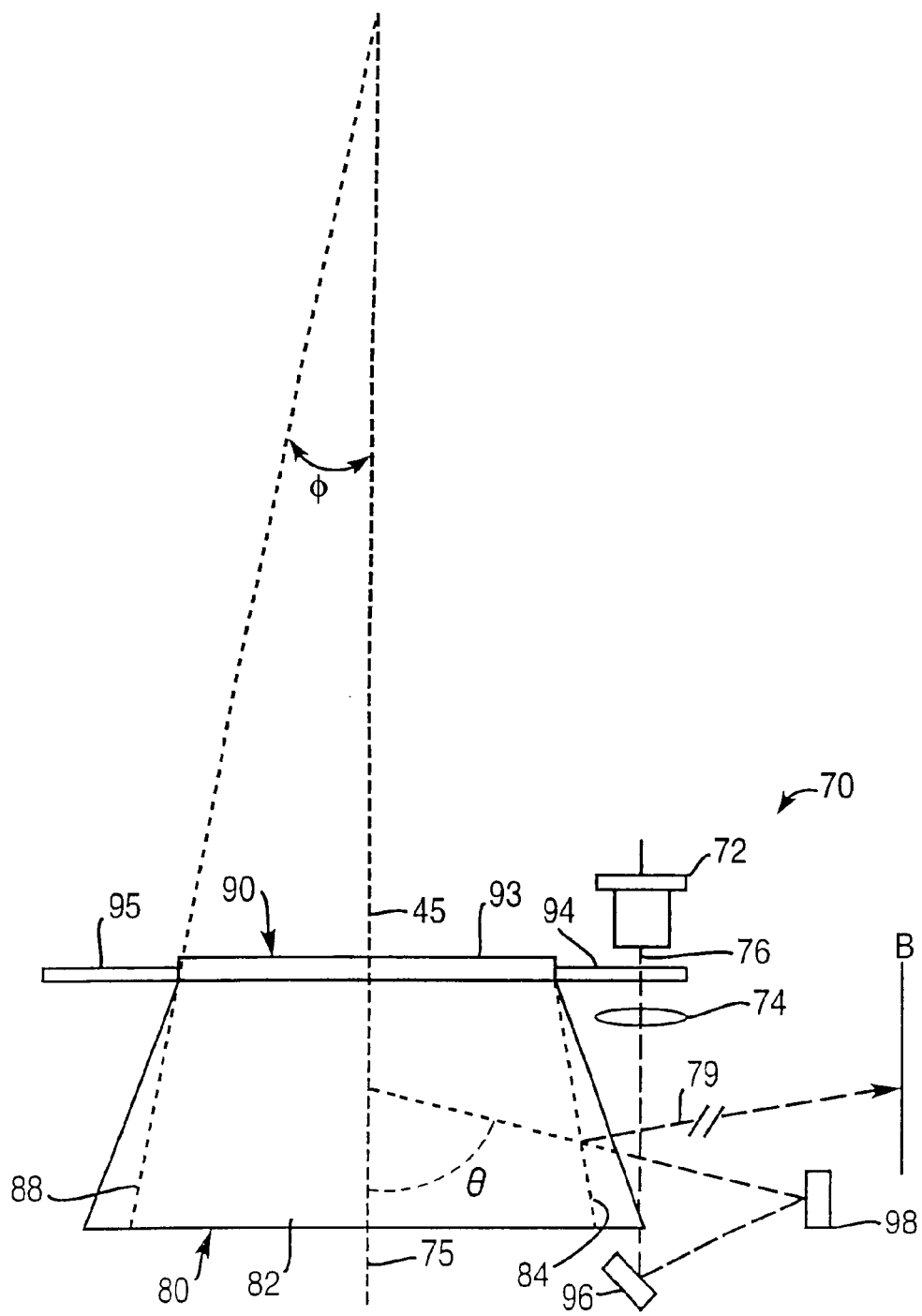
Figure 7:
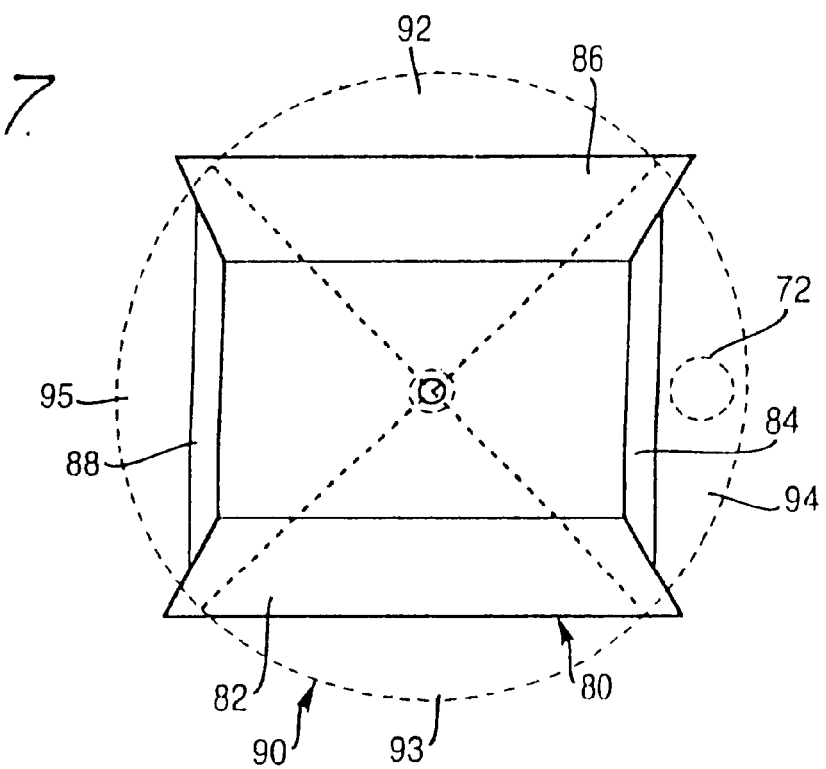
FIG. 7 is a top view of the system of FIG. 6 with certain components shown by dashed lines.

FIGS. 5–8 illustrate a preferred embodiment of a scanning system 70 which combines the features of both the first embodiment FIGS. 1–2 and the second embodiment FIGS. 3–4. The system 70 includes rotating polygon mirror 80 having mirror facets 82, 84, 86, 88 driven by a motor 85. An optical adjustment element 90 is mounted to the facet wheel 80 and rotates therewith. A light source 72 generates a reading beam 76 which is directed along a path parallel to the rotational axis 75 of the facet wheel 80. The adjusting element 90 comprises a plate having four (actually two or more) sectors 92, 93, 94, 95 each sector being arranged proximate a facet of the polygon mirror. In the position as shown in FIG. 5, the beam 76 passes through thick plate sector 92, is focused by focusing lens 74 and then is scanned by facet 86 to produce scan beam 78. By operation of the thick plate sector 92, the scan beam 78 is focused at long range focal plane A and by operation of the incident angle β of the beam 76 parallel to rotational axis 75 the scan beam 78 is scanned over a narrow scan angle. In the position as shown in FIG. 6, the beam 76 passes through thin plate sector 94, is focused by focusing lens 74, reflected by fold mirrors 96, 98 and then is scanned by facet 84 to produce scan beam 79. By operation of the thin plate sector 94, the scan beam 79 is focused at short range focal plane B and by operation of the incident angle θ of the beam 76 generally perpendicular to rotational axis 75 the scan beam 79 is scanned over a wide scan angle.

The system 70 automatically (1) focuses the scan beam 78 at far focal plane A and scans it over a narrow scan angle and (2) focuses the scan beam 79 at near focal plane B and scans it over wide scan angle. In the use of a handheld bar code scanner, the scan lines formed at the two focus planes A, B is thus kept closer to constant length. Further, scanning the beam more slowly at the far focal plane (i.e. at a slower angular velocity) results in an otherwise slower spot speed which allows the signal processor to better resolve signals at the far focal plane.

Though each plate sector may comprise a different thickness, construction and/or material, the plate 90 of FIGS. 5–8 is preferably (but not necessarily) symmetrical, having thin plate sectors 94, 95 opposite each other and thick plate sectors 92, 93 opposite each other. Such a symmetrical structure for plate 90 provides for a balanced component such that when rotated it does not create imbalances thereby minimizing torque on the drive components. Similarly, though the mirror facets may be of any suitable size or shape, the facets of polygon mirror 80 in FIGS. 5–8 are symmetrically arranged. Facets 82, 86 are the same size and shape (and optionally arranged at the same angle α) and arranged on opposite sides to one another and facets 84, 88 are the same size and shape (and optionally arranged at the same angle φ) and arranged on opposite sides to one another. Such a symmetrical structure for the facet wheel 80 provides for a balanced component such that when rotated it does not create imbalances thereby minimizing torque on the drive components. Though a symmetric structure is preferred for mechanical balance purposes, any number of mirror facets, asymmetric or symmetric may be employed. Mechanical balancing may be accomplished by other mechanisms.

The number of plate sectors in the system 70 or the other embodiments need not be the same as the number of mirror facets. For example, the polygon mirror 80 may have eight facets (each facet bifurcated along line 75) with each plate sector disposed over and spanning two facets.

Figure 8:
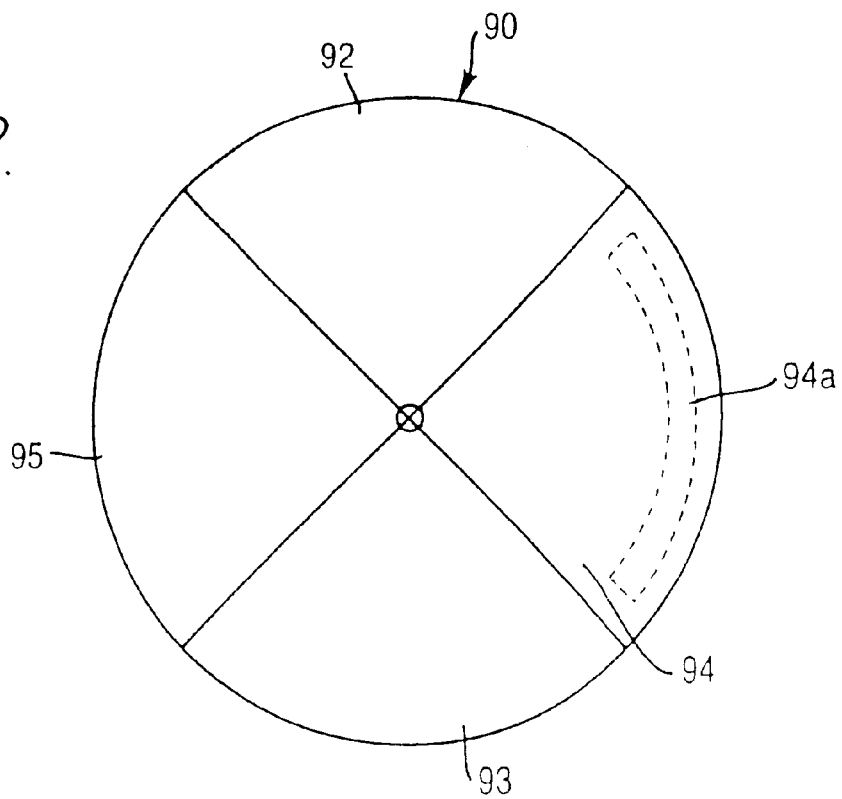
FIG. 8 is top view of the optical plate of FIG. 7.

FIG. 8 illustrates the plate 90 comprising four sectors 92–95, each sector being pie-shaped. Since the light beam only passes through an outer portion of the sector, the plate 70 comprise a wagon wheel configuration with optical elements such as element 94a disposed around the outer perimeter. The rest of the plate 90 may merely comprise a frame for holding the optical elements. This configuration may reduce cost of manufacture by minimizing the amount of the possibly more expensive material which forms the optical element(s) of the component.

Figure 9:
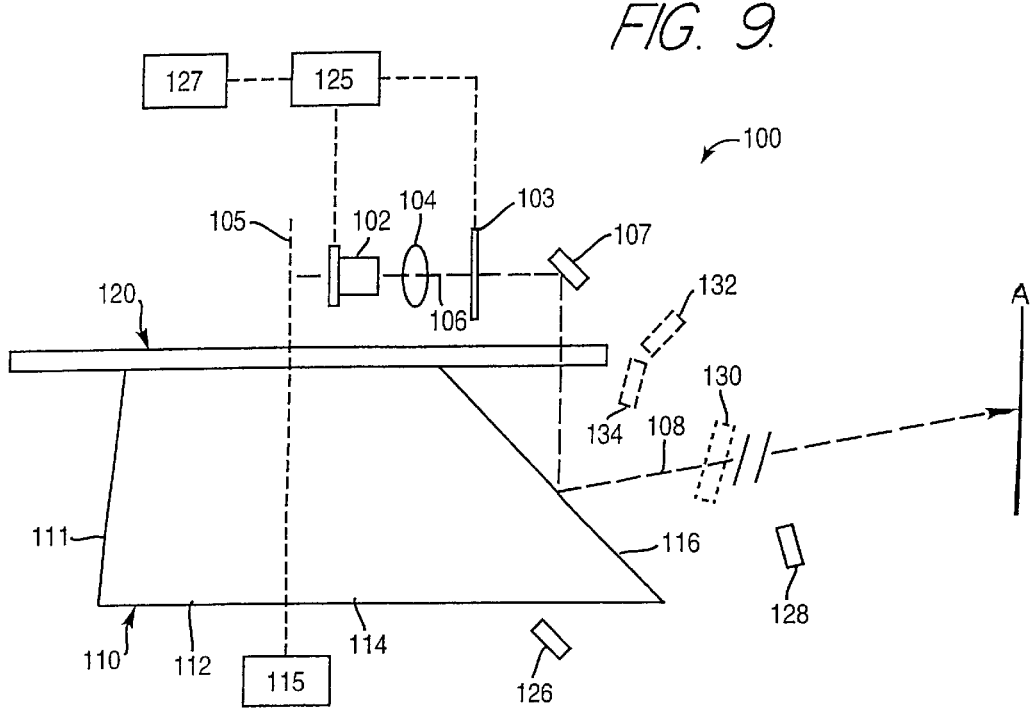
FIGS. 9–10 are schematic diagrams illustrating a scanning system according to a fourth embodiment.
Figure 10:
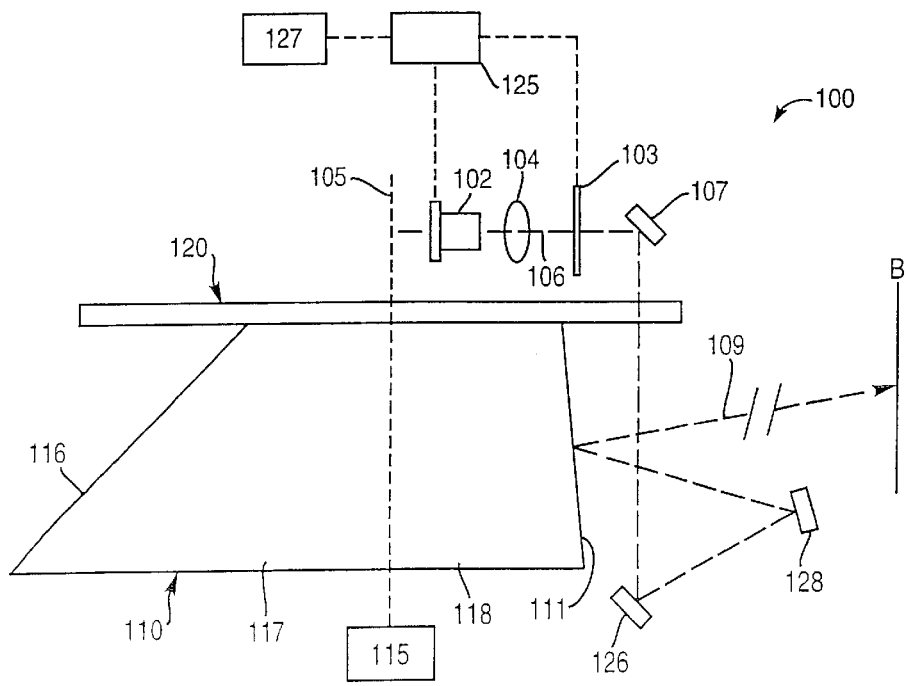

The system 100 of FIGS. 9–10 illustrates some alternative configurations and elements which may be employed in place of or in combination with the previous embodiments. The system 100 includes a rotating polygon mirror 110 having six mirror facets 111, 112, 114, 116, 117, 118 rotating about axis 105 driven by motor 115. The optical adjusting element 120 is mounted to and rotates with the polygon mirror 110 to form a rotating assembly 110/120. In this embodiment, the laser diode 102 and focusing lens 104 are positioned to one side of the polygon mirror 110 and produce a light beam 106 that is reflected by a fold mirror 107 onto the scanning mirror facets. Such a structure may provide a more compact arrangement. The optical adjusting element 120 may comprise any suitable device such as the optical plate of previous embodiments, or a holographic disk having different sectors. The holographic disk allows for adjustment of focus even for an adjustment element positioned well downstream of the focusing lens 104. Alternately, the holographic disk may adjust other optical properties of the beam 106 such as beam power or intensity, beam shape, beam angle or other.

After being focused by the focusing lens 104, the beam 106 is reflected by fold mirror 107 along a path parallel to the rotational axis 105 of the facet wheel 110. The adjusting element 120 has sectors corresponding to the particular mirror facet. In the position as shown in FIG. 9, the beam 106 passes through one end of the element 120 (where a characteristic of the beam e.g. focus is adjusted) and then is scanned by facet 116 to produce scan beam 108. By operation of the sector of element 120 through which the beam has passed, an optical characteristic of the scan beam 108 is set for a particular scan line formed such as at plane A. Further by operation of the incident angle of the beam 106 parallel to rotational axis 105, the scan beam 108 is scanned over a narrow scan angle. In the position as shown in FIG. 10, the beam 106 passes through another sector of the element 120 (where a beam characteristic is adjusted), is reflected by fold mirrors 126, 128 and then is scanned by facet 111 to produce scan beam 109. By operation of the sector of the element 120 through which the beam has passed, an optical characteristic of the scan beam 109 is set for a particular scan line formed such as at plane B and by operation of the incident angle of the beam 106 generally perpendicular to rotational axis 105 the scan beam 109 is scanned over a wider scan angle.

With or without the adjusting element 120, other control mechanisms may be applied to the scanning system 100. The system 100 may include a controller 125 which controls operation of the laser diode 102 and/or a control module 103 positioned in the path of light beam 106. The control module 103 may comprise a shutter mechanism (LCD or mechanical) such as described in Rudeen U.S. Pat. No. 5,641,958 hereby incorporated by reference. The controller 125 may automatically control the module 103 to set beam waist location at far plane A when scan beam 108 is being formed off facet 116 and set the waist location at near plane B when scan beam 109 is being formed off facet 111.

The control module 103 may have moving elements or LCD elements which are electronically actuated, but unlike the rotating adjusting element 120, the control module 103 is otherwise stationary relative to the light source 102.

In another embodiment, the scanner may have multiple operational modes such as described in U.S. application Ser. Nos. 08/792,829 or 08/887,244 incorporated by reference. For example, the controller 125 may either turn off the beam (via control of the light source 102) or selectively block the beam (via control at module 103), thus for example only forming scan beam 109 during a given operational mode. Via a first setting of manual switch 127, the beam 106 is controlled so as only to be active when striking certain mirror facets, such as facet 111 as in FIG. 10 producing a single scan line 109 focused for near range scanning at plane B and having wider scan angle for near plane "pick" scanning (for example, scanning a bar code out of a manual). Via a second setting of switch 127, the beam 106 is controlled so as only to be active when striking other mirror facets, such as facet 116 as in FIG. 9 producing a scan beam 109 focused for far range scanning at plane A and having narrow scan angle for reflecting off an array of pattern mirrors 130, 132, 134 (shown diagrammatically) generating a complex scan pattern, typically of intersecting scan lines in a scan volume.

Figure 11:
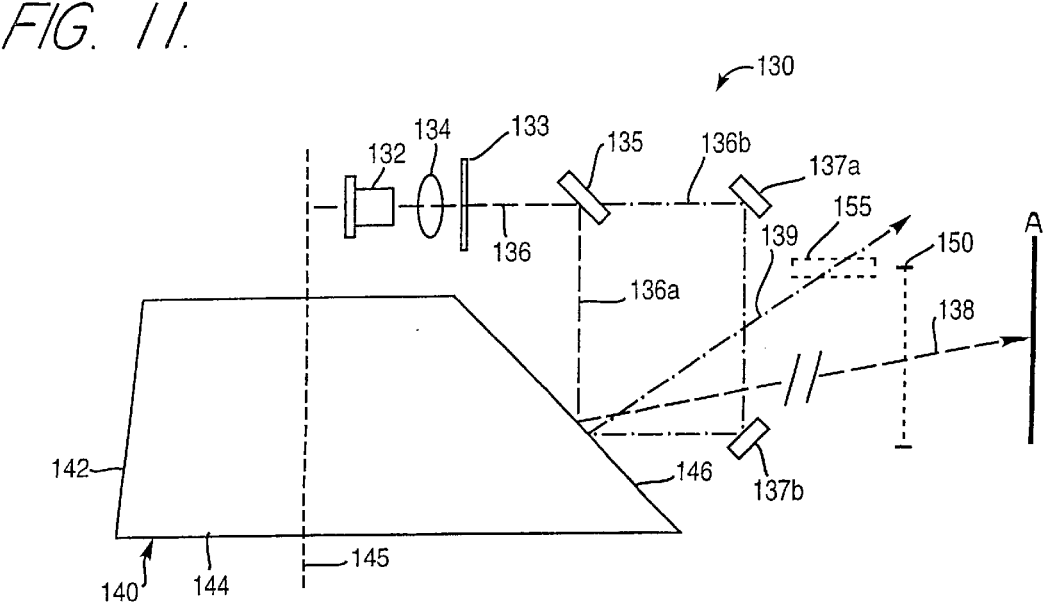
FIGS. 11–12 are schematic diagrams illustrating a scanning system according to a fifth embodiment.
Figure 12:
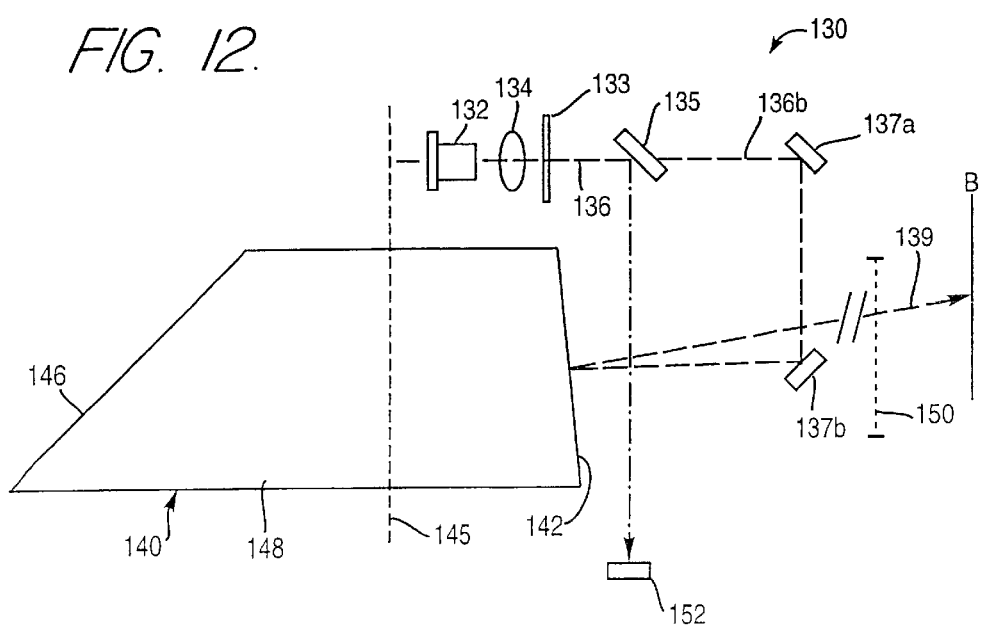

FIGS. 11–12 illustrate another scanning system 130 according to another alternative configuration. The system 130 includes a rotating polygon mirror 140 having mirror facets 142, 144, 146, 148 rotating about an axis 145 driven by a motor (not shown), such motor drive being known to one skilled in the art. The mirror facet and beam mirror routing configuration permits alternating scan angles to be generated by the polygon mirror 140. In this embodiment, a laser diode 132 is positioned on one side of the polygon mirror 140 generating an optical beam 136 along a path perpendicular to the rotational axis 145. The optical beam 136 is focused by a focusing system, shown as a focusing lens 134, and then directed onto a beam splitting element 135. The beam splitting element 135 may be a static and stationary element and may provide certain control properties as will be described below. In its simplest form, the beam splitting element 135 splits the beam 136 into two components allowing a first beam component 136a to be reflected and a second beam component 136b being transmitted therethrough. As shown in FIG. 11, the beam portion 136a which is reflected by the beam splitting element 135 is reflected and scanned by mirror facet 146 over a narrow scan angle producing a scan beam 138. The narrow scan angle beam 138 being effective for scanning a bar code at far range such as at plane A. The beam portion 136b which passes through the beam splitting element 135 is reflected by fold mirror 137a and then off the second fold mirror 137b and onto the facet 146 at an angle producing a scan beam 139 which does not pass through the scanner window 150.

As shown in FIG. 12, as the polygon mirror 140 is rotated, consecutive facets of the polygon mirror 140 are moved into the beam path for scanning the beam and creating scan lines. As the mirror facet 142 is brought into position, the reflected portion 136a of the beam 136 misses or bypasses the facet 142 and is not scanned thereby. The second beam portion 136b passes through the beam splitting element 135 and is reflected by fold mirrors 137a and 137b and redirected onto the mirror facet 142 where it is scanned over a scan angle creating a scan beam 139 out through scanner window 150.

The configuration of FIGS. 11 and 12 may produce a narrower scan angle for scan beam 138 (FIG. 11) and a wider scan angle for scan beam 139 (FIG. 12).

The device of FIGS. 11 and 12 may also be equipped with a beam adjustment mechanism such as the optical plate 30 of FIG. 1 or the holographic element 120 of FIG. 9, the optical element being in the path of both beam portion 136a and beam portion 136b. Applying an optical focus plate, the beam portion 136a would be focused when reflecting off of facet 146 to far focal plane A (FIG. 11) and beam portion 136b be focused when reflecting off of mirror facet 142 to near plane B (FIG. 12).

Alternately, the system 130 may include an optical control element 133 such as an LCD module. The control module 133 could control focus of the beam 13G such that when the facet 146 is producing scan beam 138, the beam is focused to far plane A and when the facet mirror 142 is producing scan beam 139, the optical control element 133 would focus the beam 136 at near plane B.

Control of the diode 132 and/or the control element 133 may be operated such that only one of beam portions 136a or 136b is produced thereby selectively generating either scan beam 138 or scan beam 139. The handheld scanner may thus be configured with a manual control switch to allow the user to select (1) narrow scan angle focused at far plane A or (2) wide scan angle focused at near focal plane B.

Though the beam 136 is split into simultaneously active beam portions 136a, 136b, the scanner structure is configured such that only one reading beam (i.e., scan beam) is produced which exits the scanner.

As shown in FIG. 11, the beam portion 136b producing scan beam 139 is reflected at an angle such that it does not exit the scanner window 150 and is thus not used for reading when reflecting off of mirror facet 146. Similarly as shown in FIG. 12, beam portion 136a is not scanned, missing mirror facet 142 and thus also is not employed for reading. Thus, only one reading/scan beam is produced at a time, the system 130 switching between scan beams 138, 139 as the polygon mirror 140 rotates. These "non-used" beam portions may be "recycled" for other functions. For example, a detector may be placed in the beam path (for example, detector 152 in FIG. 12) for providing a signal to assist in motor timing and control. Alternately, the unused beam may be reflected and employed as an aiming beam or spot. The scan beam 139 in FIG. 11 could be reflected by a mirror 155, the mirror having a curvative which causes the beams to be scanned over a narrower scan angle to increase brightness at the target. Alternately, the beam 136a in FIG. 12 not being scanned could be reflected and appear as a stationary spot at the focal plane.

In the embodiment where the beam 136 is normally split at all times, the beam splitter 135 may be configured to transmit and reflect any desired proportion of the beam power. Since higher power is required for far focal plane scanning, the beam splitting element 135 may be configured to permit transmission of 30 percent and reflection of 70 percent enabling 70 percent beam power for generating scan beam 138 for far range scanning and 30 percent for generating scan beam 139 for near range scanning.

Figure 13:
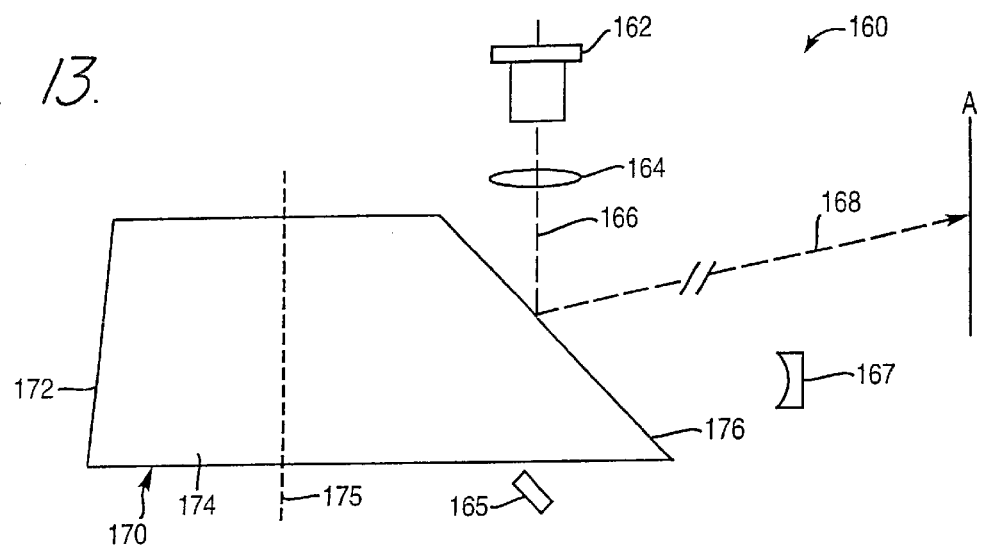
FIGS. 13–14 are schematic diagrams illustrating a scanning system according to a sixth embodiment.
Figure 14:
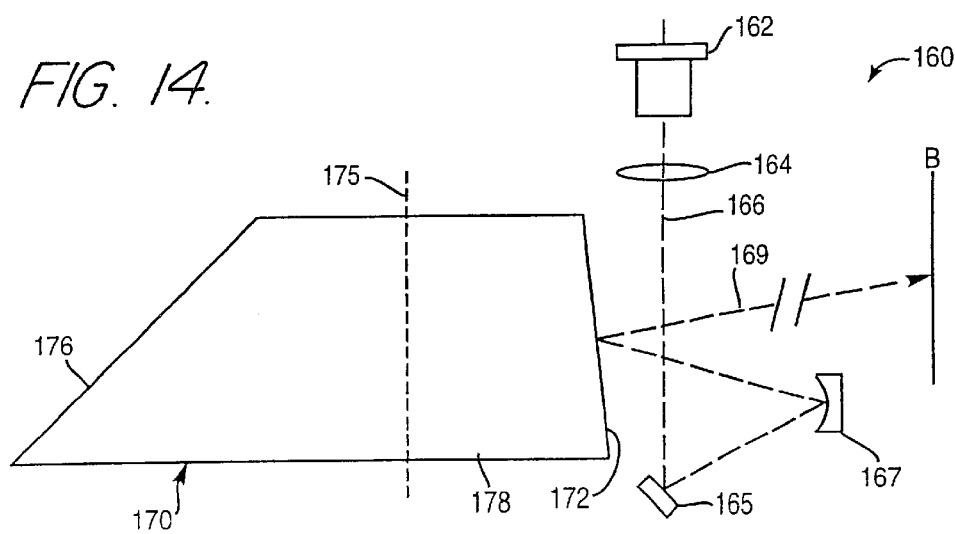

FIGS. 13–14 illustrate another embodiment of a scanning system 160 which provides both automatic scan angle and focus control with a narrow scan angle and far focus at far focal plane A and wide scan angle and near focus at near focal plane B. The polygon mirror 170 has mirror facets 172, 174, 176, 178 rotating about a rotational axis 175 by a motor (not shown). A light source such as laser diode 162 produces a reading beam 166 which is focused by a focusing system illustrated as lens 164. In FIG. 13, as the polygon mirror 170 rotates, the mirror facet 176 is moved into the beam path of the beam 166 scanning the beam across the scan angle to produce a scan beam 168. The system is designed such that the beam 166 is focused via the lens 164 to have a waist approximately at the far focal plane A. With the relative angle of the mirror facet 176 to the rotational axis 175 in the beam path 166 being parallel to the rotational axis 175, a narrow scan angle is produced for the scan beam 168.

As the polygon mirror 170 is rotated to place mirror facet 172 into position for scanning, the light beam 166 misses or bypasses the mirror facet 172 and is then redirected by mirrors 165 and 167 back toward the mirror facet 172 whereby the beam is scanned across the scan angle to produce a scan beam 169 producing a scan line and the scan volume. The beam 166 is refocused by mirror 165 and/or mirror 167 to a nearer focal plane such that the scan beam 169 is focused to a waist at approximately the near focal plane B. For example, the mirror 167 may have either positive or negative optical power and may further include aberration correction if desired.

Figure 15:
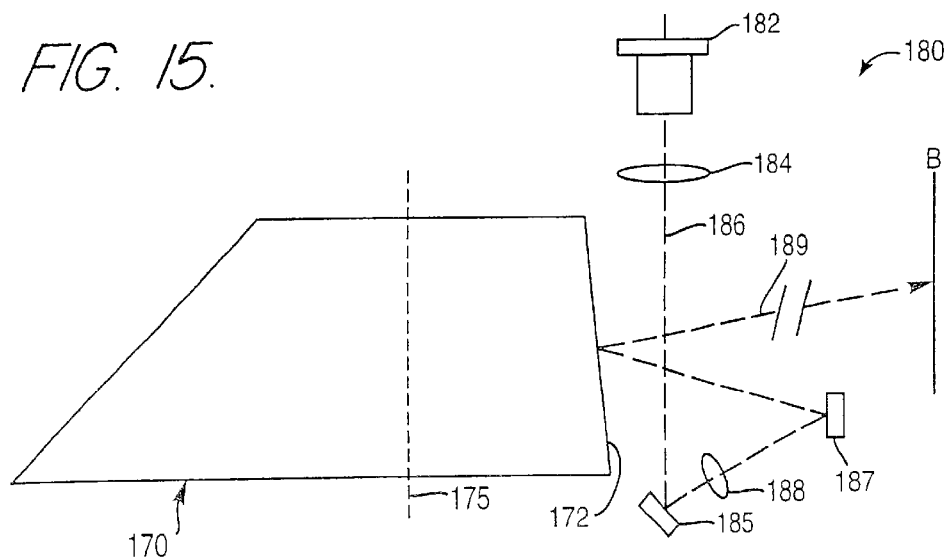
FIG. 15 is a schematic diagram illustrating an alternate bypass focusing scheme for the embodiment of FIGS. 13–14.

FIG. 15 illustrates an alternative embodiment to the refocusing system illustrated in system 160 of FIG. 14. In the system 180 in FIG. 15, the laser diode 182 generates a light beam 186 which is focused by 184. When the mirror facet 172 is in position for scanning, the beam 186 bypasses the mirror facet 172 and then is folded by a first mirror facet 185 where it is focused by a lens element 188 and then reflected off mirror 187 onto the mirror facet 172. Then the beam is scanned over a scan angle to produce a scan beam 189. The focal properties of the lens 188 (alone or in combination with any optical power provided by mirrors 185, 187) refocuses the scan beam 189 to a waist location at approximately the near scan plane B. The lens element 188 may be positioned in any suitable position including (1) between fold mirrors 185, 187 as in FIG. 15, (2) upstream of fold mirror 185 (probably immediately adjacent the fold mirror 185), or (3) downstream of fold mirror 187.

Figure 16:
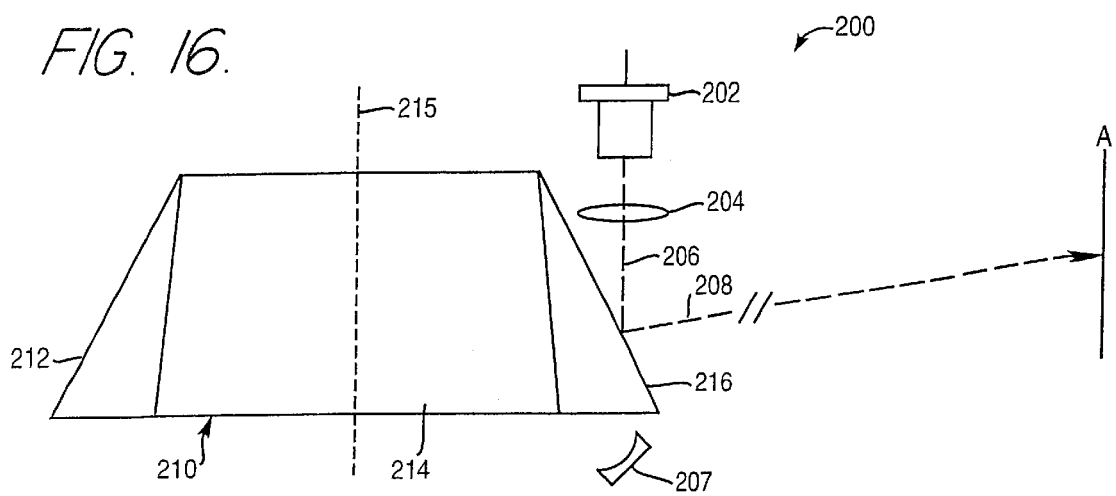
FIGS. 16–17 are schematic diagrams illustrating a scanning system according to a eighth embodiment.
Figure 17:
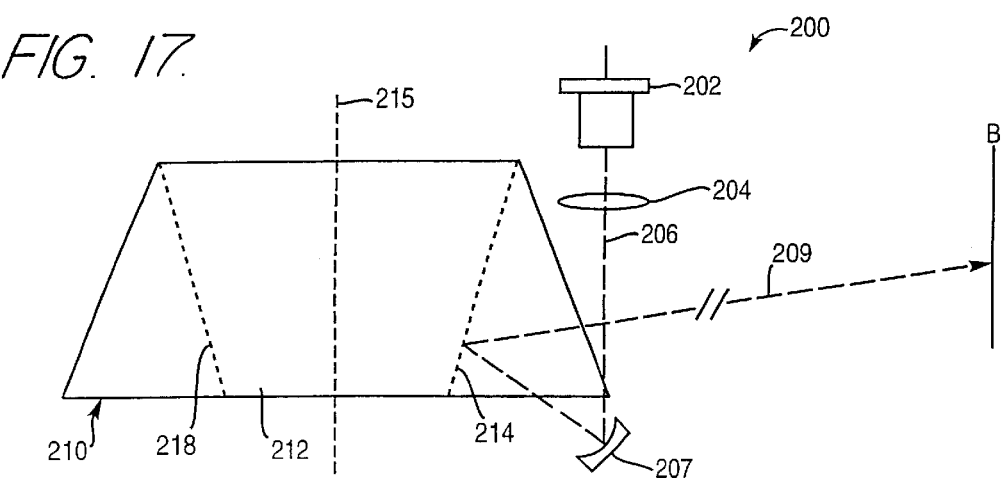

FIGS. 16–17 illustrate an alternative scanning system 200 including a polygon mirror 210 having a plurality of mirror facets 212, 214, 216, 218. The light source 202 produces a light beam 206 which is focused by a lens element 204. The beam 206 is directed in a path parallel to the rotational axis 215 of the polygon mirror 210. As the polygon mirror 210 is rotated by a motor (not shown), the beam 206 is scanned across a scan angle by mirror facet 216 (when the polygon mirror 210 is in the position as shown in FIG. 16) producing scan beam 208 over a given scan angle. Due to the incident angle of the beam 206 onto the mirror facet 216, the scan angle of scan beam 208 is a narrow scan angle.

When the mirror polygon 210 is rotated to position mirror facet 214 in the beam path, the beam 206 bypasses the mirror facet 214 and is reflected by fold mirror 207 onto the mirror facet 214 which scans the beam across a scan angle to produce a scan beam 209. The mirror facets 212 and 216 are outwardly angled facets of the mirror polygon 210 and the mirror facets 214, 218 are inwardly angled facets of the polygon mirror 210. Due to the inward angle of the mirror facet 214, a single fold mirror 207 may be provided for directing the bypassed beam 206 onto the mirror facet 214.

The system of FIGS. 16–17 may include the optical plate configuration of, for example, FIG. 5 or alternately the holographic plate of FIG. 9 or one of the other focusing schemes of the previous embodiments to provide selective focus of the scan beam 209 to near focal plane B in conjunction with a narrower scan angle generated. FIGS. 16 and 17 illustrate an alternate embodiment where the fold mirror 207 is provided with optical power (either positive or negative) to refocus the beam 206 to the desired waist location. Alternately, a focusing lens either upstream or downstream of the fold mirror 207 may be employed as described in the previous embodiment of FIG. 15.

Figure 18:
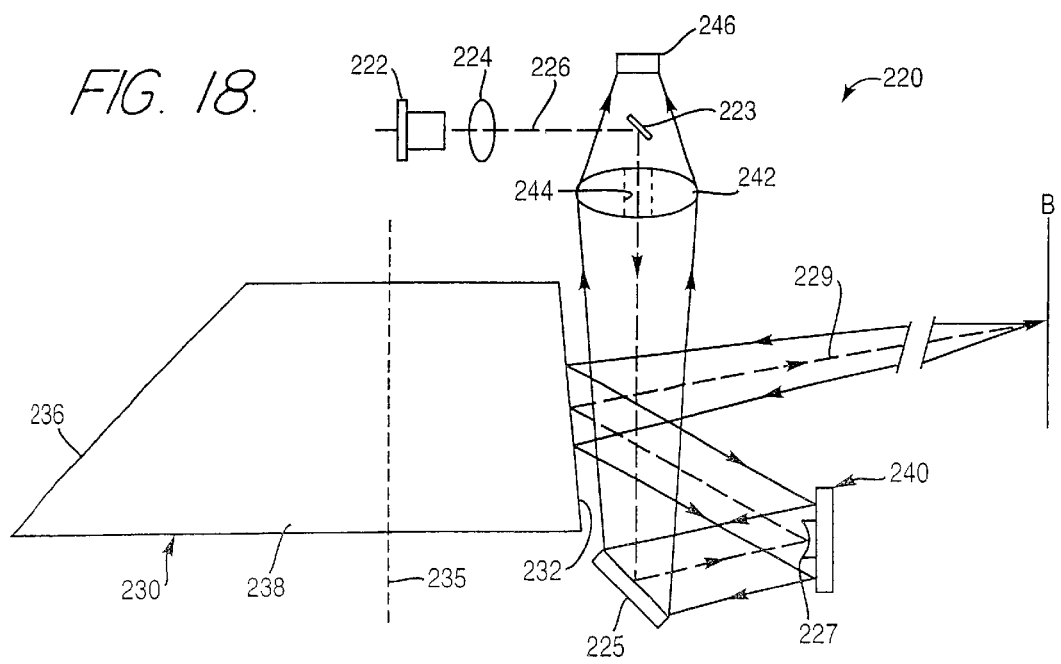

The above described systems preferably comprise a non-retrodirective system, but may be configured with a retro-directive system as shown in the scanning system 220 of FIGS. 18–19. In the system 220, a light source such as laser diode 222 produces a light beam 226 which is focused by focusing lens 224. The light beam 226 is reflected by a small fold mirror 223 preferably mounted on the back of collection lens 242, the light beam being redirected along a path generally parallel to the rotational axis 215 of the polygon mirror 230. The collection lens 242 has a central portion 244 through which the light beam 226 passes. The central portion 244 may be a focusing element or may be a hole or void for permitting passage of the light beam 226.

The polygon mirror 230 includes a plurality of mirror facets. For ease of description, the polygon mirror 230 is illustrated with four mirror facets, 232, 234, 236, 238. Preferably the mirror facets are symmetrically arranged about the polygon mirror 230 to produce a balanced structure, but for ease of description and illustration, an asymmetrical arrangement is illustrated. When the polygon mirror 230 is in position as illustrated in FIG. 18, the beam 226 misses or bypasses the mirror facet 232 and is then reflected by fold mirrors 225 and 240 back onto the mirror facet 232, whereby it is scanned across the scan angle to produce scan beam 229. Outgoing focus adjustment of the light beam 226 may be provided by including a focusing mirror 227 at the fold mirror 240 for positioning the waist at the desired position at near focal plane B. As described in previous embodiments, the beam may be focused by lens elements or mirror elements in vicinity of the fold mirrors 225, 240. Light that is reflected and is scattered off of a target during scanning is returned retrodirectively along a path off of the scan facet 232, fold mirror 240, fold mirror 225 and then focused by the collection lens 244 and onto to detector 246.

Alternately, collection may be accomplished by a suitable collection mirror system. The fold mirror 223 is preferably small and integrally formed with the collection lens 242 to minimize interference with collection light beam focused onto the detector 246. Since the outgoing beam 226 is a focused beam, the outgoing beam elements such as mirror 227 may be small so as to minimize interference with light collection.

As shown in FIG. 19, when the polygon mirror 230 is rotated into position whereby the mirror facet 236 is positioned in the outgoing beam path, the beam 226 is scanned off mirror facet 236 over a given scan angle to produce scan beam 228. Due to the incident angle of the light beam 226 parallel to the rotational axis 235, a more narrow scan angle is produced which is better suited for long range scanning at far plane A. The focal properties of the system may also be configured to locate the waist near far focal plane A.

Another alternate scanning system 250 is illustrated in FIG. 20 employing a non-retrodirectional collection system. In system 250, a laser diode 252 is mounted to a printed circuit board 280 producing a light beam 256. The light beam 256 passes through an opening in driver (printed circuit board) PCB 286. The polygon mirror assembly 260 is mounted on an internal shaft along rotational axis 275. The drive motor 285 is mounted onto PCB 286 on a side opposite the polygon mirror 275. The motor 285 may be integrally formed with components on the PCB 286 such as the motor drive configuration disclosed in U.S. Pat. No. 5,475,206, incorporated by reference. An optical plate 270 is mounted to rotate with the polygon mirror 260. The optical plate has multiple sections 272, 274, 276 which are alternately disposed in the path of the beam 256 depending upon the rotational position of the polygon mirror 260 (the fourth plate section not being visible in FIG. 20). The operation of the optical plate 270 may be as described in previous embodiments of FIGS. 1–2, 4–8, or the holographic plate of FIGS. 9–10. The beam 256 is then focused by focusing lens element 254 shown this embodiment as downstream of the optical plate 270.

When the polygon mirror 260 is rotated into position such that the mirror facet 262 (the more radially outward extending facet) is in position for scanning, beam 256 is scanned over a given scan angle producing a scan beam into the scan volume. When the polygon mirror 260 is rotated to position facet 264 in position for scanning, the beam 256 bypasses the polygon mirror as reflected off of fold mirrors 256 and 257 back onto the mirror facet 264 where it is scanned over a scan angle. The operation of the polygon mirror 260 may be as described in previous embodiments and may be modified similarly.

The light beam that is reflected off of a target such as a bar code is directly collected by a collection lens, shown as a toroidal collection lens 282 mounted on the PCB 280 and focused thereby onto a detector 284. Further details of a toroidal lens collection and detector system may be found in U.S. Pat. No. 5,475,206 incorporated by reference.

Another alternate scanning system 300 is illustrated in FIG. 21 employing a non-retrodirectional collection system and further illustrating an example component mounting system. A laser diode 302 generates a light beam 306 which is focused by the lens 304 and directed onto a facet 312 of the polygon mirror 310. The optical plate or holographic disk 320 is mounted to rotate with the polygon mirror 310. The optical plate 320 has multiple sections which are alternately disposed in the path of the beam 306 depending upon the rotational position of the polygon mirror 310. The operation of the optical plate 320 may be as described in previous embodiments of FIGS. 1–2, 4–8, or the holographic plate of FIGS. 9–10. The beam 306 is then focused by focusing lens element 304 shown in this embodiment as downstream of the optical plate 320.

When the polygon mirror 310 is rotated into position such that the mirror facet 312 (the more radially outward extending facet) is in position for scanning, beam 306 is scanned over a given scan angle producing a scan beam 309 which is directed out a window 339 and into the scan volume. When the polygon mirror 310 is rotated to position facet 313 in position for scanning, the beam 306 bypasses the polygon mirror 310 and is reflected off of fold mirrors 316 and 318 back onto the mirror facet 313 where it is scanned over a scan angle. The operation of the polygon mirror 310 thus may be as described in previous embodiments and may be modified similarly.

The light beam that is reflected off of a target such as a bar code is directly collected by a collection lens, shown as a toroidal collection lens 342 mounted on the PCB 340 and focused thereby onto a detector 344.

In system 300, the chassis 330 is preferably an integrally formed cast metal component onto which all the scan engine components may be mounted. Alternately, the chassis 330 may be an integrally molded plastic element. Though the chassis is preferable formed in a one-piece construction, it may be formed in multiple pieces.

The chassis 330 has a first section 332 and a second section 336. The first section 332 includes a U-shaped holder 334 to which the laser diode 302 is mounted on one arm and the focusing lens 304 is mounted on the other arm. The holder 334 thus may provide for pre-alignment of the lens 304 and laser diode 302. The holder 334 may further include an insert 335 for permitting adjustment of alignment or location of the laser diode 302 and/or an insert 337 for permitting adjustment of alignment or location of the lens 304.

The remaining elements are mounted via the second chassis section 336. The polygon mirror 310 is mounted on a shaft (not shown) which is driven by drive motor 325. The motor 325 is mounted onto the second chassis section 336. The second chassis section may include an indentation into which the motor 325 is mounted thereby providing pre-alignment for motor installation. The optical plate 320 is mounted to rotate with the polygon mirror 310, the components interconnected by mounting strut 315 (which may be cylindrical is shape) extending therebetween. The fold mirrors 316, 318 are also mounted to mounting positions on the second chassis 336.

The printed circuit board 340 is mounted to the bottom side of the chassis 330 with the collection lens 342 and detector 344 mounted onto the PCB 340.

Though the illustrated embodiments have been single light source, single beam embodiments, the configuration may be applied to dual source or dual beam systems such as disclosed in U.S. Pat. Nos. 5,869,827 or 5,837,988 hereby incorporated by reference.

Thus the present invention has been set forth in the form of its preferred embodiments. It is nevertheless intended that modifications to the disclosed scanning systems may be made by those skilled in the art without altering the essential inventive concepts set forth herein.

What is claimed is:

1. A data reader comprising
   a light source generating a light beam;
   a scanning mirror for scanning the light beam;
   a motor for moving the scanning mirror about an axis;
   wherein the light beam is directed along a first beam path for a first given period onto the scanning mirror at a first incident angle to the axis such that the light beam is scanned over a first scan angle after which the light beam is then directed along a second beam path for a second given period onto the scanning mirror at a second incident angle to the axis different from the first incident angle such that the light beam is scanned over a second scan angle wider than the first scan angle.

2. A data reader according to claim 1 wherein the scanning mirror comprises a rotating polygon mirror.

3. A data reader comprising
   a light source generating a light beam;
   a scanning mirror for scanning the light beam, the scanning mirror comprising a polygon mirror;
   a motor for moving the scanning mirror about an axis;
   wherein the light beam is directed along a first beam path onto the scanning mirror at a first incident angle to the axis such that the light beam is scanned over a first scan angle;
   wherein the light beam is directed along a second beam path onto the scanning mirror at a second incident angle to the axis different from the first incident angle such that the light beam is scanned over a second scan angle wider than the first scan angle,
   wherein the light beam along the first beam path is directed onto the polygon mirror generally parallel to the axis of the polygon mirror, and the light beam along the second beam path is directed onto the polygon mirror generally perpendicular to the axis.

4. A data reader comprising
   a light source generating a light beam;
   a scanning mirror for scanning the light beam, the scanning mirror comprising a polygon mirror;
   a motor for moving the scanning mirror about an axis;
   wherein the light beam is directed along a first beam path onto the scanning mirror at a first incident angle to the axis such that the light beam is scanned over a first scan angle;
   wherein the light beam is directed along a second beam path onto the scanning mirror at a second incident angle to the axis different from the first incident angle such that the light beam is scanned over a second scan angle wider than the first scan angle,
   wherein the polygon mirror comprises at least a first mirror facet and a second mirror facet, wherein the first beam path of the light beam is generally parallel to the axis, wherein the first mirror facet is constructed and arranged at an angle to the axis such that the light beam parallel to the rotational axis is reflected and scanned by the first mirror facet, wherein a second mirror facet is constructed and arranged such that the light beam parallel to the rotational axis bypasses the second mirror facet and is re-routed onto the second mirror facet along a path generally perpendicular to the axis whereby it is scanned by the second mirror facet.

5. A data reader according to claim 4 further comprising fold mirrors for routing the light beam which has bypassed the second mirror facet back onto the second mirror facet.

6. A data reader according to claim 5 wherein the first mirror facet is arranged at an angle of about 45° to the axis and wherein the second mirror facet is arranged generally parallel to the axis.

7. A data reader comprising
   a light source generating a light beam;
   a scanning mirror for scanning the light beam, the scanning mirror comprising a polygon mirror;
   a motor for moving the scanning mirror about an axis;
   wherein the light beam is directed along a first beam path onto the scanning mirror at a first incident angle to the axis such that the light beam is scanned over a first scan angle;
   wherein the light beam is directed along a second beam path onto the scanning mirror at a second incident angle to the axis different from the first incident angle such that the light beam is scanned over a second scan angle wider than the first scan angle;
   an optical correction element mounted to rotate with the polygon mirror and positioned between the scanning mechanism and the light source such that the light beam passes therethrough, the optical correction element having a plurality of zones of varying optical properties, including (a) a first zone through which the light beam passes and subsequently proceeds along the first beam path onto the scanning mirror and (b) a second zone through which the light beam passes and subsequently proceeds along the second beam path onto the scanning mirror,
   wherein the light beam passing through the first zone is focused to a first distance out from the scanning mirror and wherein the light beam passing through the second zone is focused to second distance out from the scanning mirror nearer than the first distance.

8. A data reader according to claim 7 wherein the optical correction element comprises an optical plate, the zones comprising portions of the optical plate having different thickness.

9. A data reader according to claim 7 wherein the optical correction element comprises a holographic disk.

10. A method of data reading comprising the steps of
generating light;
providing a scanning mirror for scanning the light;
moving the canning mirror about an axis;
directing the light toward the scanning mirror for a first given period so as to impinge upon the scanning mirror at a given first incident angle relative to the axis;
scanning the light over a scan angle with the scanning mirror;
changing the scan angle by changing the incident angle to a given second incident angle relative to the axis at which the light impinges upon the scanning mirror, the second incident angle being different than the first incident angle.

11. A method according to claim 10 wherein the step of changing the scan angle comprises changing scan line length.

12. A method according to claim 10 wherein the step of changing the incident angle comprises switching between a first beam path and a second beam path for the light being directed onto the scanning mirror.

13. A method according to claim 10 wherein the scanning mirror comprises a polygon mirror rotatable about the axis.

14. A method of data reading comprising the steps of
generating a light beam from a light source;
providing a scanning mirror for scanning the light beam;
moving the scanning mirror about an axis;
directing the light beam toward the scanning mirror so as to impinge upon the scanning mirror at a given incident angle relative to the axis;
scanning the light beam over a scan angle with the scanning mirror;
changing the scan angle by changing the incident angle at which the light beam impinges upon the scanning mirror,
wherein the scanning mirror comprises a polygon mirror rotatable about the axis,
wherein the step of changing the incident angle comprises
directing the light beam along a first beam path onto the polygon mirror at an incident angle generally parallel to the axis of the polygon mirror;
directing the light beam along a second beam path onto the polygon mirror at an incident angle generally perpendicular to the axis.

15. A data reading device comprising
means for generating a light beam;
a scanning mirror for scanning the light beam;
means for moving the scanning mirror about an axis;
means for directing the light beam along a first beam path for a given first period at a first incident angle relative to the axis onto the scanning mirror such that the light beam is scanned over a first scan angle;
subsequent means for directing the light beam along a second path at a second incident angle relative to the axis of the scanning mirror different from the first incident angle such that the light beam is scanned over a second scan angle wider than the first scan angle.

16. A method of scanning an item in a scan volume, comprising the steps of
generating a light beam from a light source;
providing a scanning mirror for scanning the light beam, the scanning mirror comprising a rotating polygon mirror having a plurality of mirror facets;
moving the scanning mirror about an axis;
directing the light beam along a first beam path onto a first facet of the polygon mirror at a first incident angle relative to the axis such that the light beam is scanned over a first scan angle;
directing the light beam along a second beam path onto a second facet of the polygon mirror at a second incident angle relative to the axis different from the first incident angle such that the light beam is scanned over a second scan angle wider than the first scan angle.

17. A method according to claim 16 further comprising switching between (a) scanning over the first scan angle and (b) scanning over the second scan angle.

18. A method according to claim 16 further comprising switching between (a) directing the light beam along the first beam path and (b) directing the light beam along a second beam path.

19. A method of scanning an item in a scan volume, comprising the steps of
generating a light beam from a light source;
providing a scanning mirror for scanning the light beam, the scanning mirror comprising a rotating polygon mirror having a plurality of mirror facets;
moving the scanning mirror about an axis;
directing the light beam along a first beam path onto the scanning mirror at a first incident angle relative to the axis such that the light beam is scanned over a first scan angle;
directing the light beam along a second beam path onto the scanning mirror at a second incident angle relative to the axis different from the first incident angle such that the light beam is scanned over a second scan angle wider than the first scan angle;
controlling focus of the light beam depending upon which mirror facet is scanning the light beam.

20. A method of scanning an item in a scan volume, comprising the steps of
generating a light beam from a light source;
providing a scanning mirror for scanning the light beam, the scanning mirror comprising a rotating polygon mirror having a plurality of mirror facets;
moving the scanning mirror about an axis;
directing the light beam along a first beam path onto the scanning mirror at a first incident angle relative to the axis such that the light beam is scanned over a first scan angle;
directing the light beam along a second beam path onto the scanning mirror at a second incident angle relative to the axis different from the first incident angle such that the light beam is scanned over a second scan angle wider than the first scan angle;
controlling beam power of the light beam depending upon which mirror facet is scanning the light beam.

21. A method of scanning an item in a scan volume, comprising the steps of
generating a light beam from a light source;
providing a scanning mirror for scanning the light beam;
moving the scanning mirror about an axis;
directing the light beam along a first beam path onto the scanning mirror at a first incident angle relative to the axis such that the light beam is scanned over a first scan angle;
directing the light beam along a second beam path onto the scanning mirror at a second incident angle relative to the axis different from the first incident angle such that the light beam is scanned over a second scan angle wider than the first scan angle;

splitting the light beam into a first beam portion and a second beam portion, wherein the step of directing the light beam along the first beam path comprises directing the first beam portion along the first beam path, wherein the step of directing the light beam along the second beam path comprises directing the second beam portion along the second beam path.

22. A method according to claim 21 further comprising placing a controller in a path of the light beam for controlling operation of the light beam such that only one of the first beam portion and the second beam portion is scanned.

23. A method of scanning an item in a scan volume, comprising the steps of generating a light beam from a light source;

providing a scanning mirror for scanning the light beam;

moving the scanning mirror about an axis;

directing the light beam along a first beam path onto the scanning mirror at a first incident angle relative to the axis such that the light beam is scanned over a first scan angle;

directing the light beam along a second beam path onto the scanning mirror at a second incident angle relative to the axis different from the first incident angle such that the light beam is scanned over a second scan angle wider than the first scan angle;

providing a manually-actuated switch for switching between (a) scanning over the first scan angle and (b) scanning over the second scan angle.

24. A method of scanning an item in a scan volume, comprising the steps of generating a light beam from a light source;

providing a scanning mirror for scanning the light beam, the scanning mirror comprising a rotating polygon mirror having a plurality of mirror facets;

moving the scanning mirror about an axis;

directing the light beam along a first beam path onto the scanning mirror at a first incident angle relative to the axis such that the light beam is scanned over a first scan angle;

directing the light beam along a second beam path onto the scanning mirror at a second incident angle relative to the axis different from the first incident angle such that the light beam is scanned over a second scan angle wider than the first scan angle;

directing the light beam along the first beam path onto the polygon mirror generally parallel to the rotational axis of the polygon mirror;

directing the light beam along the second beam path onto the polygon mirror generally perpendicular to the rotational axis.

* * * * *

UNITED STATES PATENT AND TRADEMARK OFFICE
CERTIFICATE OF CORRECTION

PATENT NO. : 6,809,847 B2
DATED : October 26, 2004
INVENTOR(S) : Alexander M. McQueen It is certified that error appears in the above-identified patent and that said Letters Patent is hereby corrected as shown below:

<u>Title page,</u>
Item [57], ABSTRACT,
Line 1, before "a system" delete "system".

<u>Column 1,</u>
Line 55, change "accordin" to -- according --;
Line 57, change "according" to -- according --.

<u>Column 4,</u>
Line 34, change "is" to -- are --.

<u>Column 5,</u>
Line 2, before "comprise" insert -- may --.

<u>Column 7,</u>
Line 8, change "13G" to -- 136 --.

<u>Column 9,</u>
Line 32, replace "to" with -- the --.

<u>Column 10,</u>
Line 4, add -- in -- after "shown".

UNITED STATES PATENT AND TRADEMARK OFFICE
CERTIFICATE OF CORRECTION

PATENT NO.   : 6,809,847 B2
DATED        : October 26, 2004
INVENTOR(S)  : Alexander M. McQueen It is certified that error appears in the above-identified patent and that said Letters Patent is hereby corrected as shown below:

Column 11,
Line 10, before "shape" change "is" to -- in --.

Column 13,
Line 4, change "canning" to -- scanning --.

Column 16,
Line 24, change "the rotational axis" to -- a rotaional axis --.

Signed and Sealed this

Second Day of August, 2005

JON W. DUDAS
*Director of the United States Patent and Trademark Office*